United States Patent [19]

Murphy

[11] Patent Number: 4,553,798
[45] Date of Patent: Nov. 19, 1985

[54] ELECTRICAL OUTLET
[76] Inventor: Peter Murphy, 5027 Erin Way, Delta, British Columbia, Canada, V4M 1K2
[21] Appl. No.: 596,610
[22] Filed: Apr. 4, 1984
[51] Int. Cl.⁴ ............................................. H01R 41/00
[52] U.S. Cl. ..................................................... 339/9 R
[58] Field of Search ...................... 339/28, 23, 24, 9 R, 339/9 RY, 159 C

[56] References Cited
U.S. PATENT DOCUMENTS
2,706,225  4/1955  Freeman ...................... 339/159 C X
4,148,544  4/1979  Markowitz ...................... 339/9 R X Primary Examiner—Eugene F. Desmond
Attorney, Agent, or Firm—Christie, Parker & Hale

[57] ABSTRACT

Apparatus to provide a remote outlet from a master electrical outlet is provided with electrical conducting recesses connected to an electrical power source. The apparatus has a plug member and conductor prongs on the plug member to engage the recesses in the master outlet. A conductor attachment is formed on the plug member, in electrical contact with the conductor prongs. There is a limb adapted to be attached to the plug member. Conductors are present in the limb, each conductor in the electrical contact with one conductor prong of the plug member. A conductor attachment in the limb releasably engages the conductor attachment at the master outlet and is in electrical contact with the conductors in the limb. There is a remote outlet with conductor recesses. There is a further conductor attachment at the distal end of the limb, in electrical contact with the conductors in the limb. Each recess is in electrical contact with a conductor in the limb. Conductor attachments are provided in the remote outlet corresponding to the further conductor attachments at the distal end of the limb and in electrical contact with the recesses in the remote outlet. The limb may be disconnected from the plug member and the remote outlet. The secondary outlet is provided remote from but duplicating the master outlet and is in electrical contact with the master outlet.

5 Claims, 19 Drawing Figures

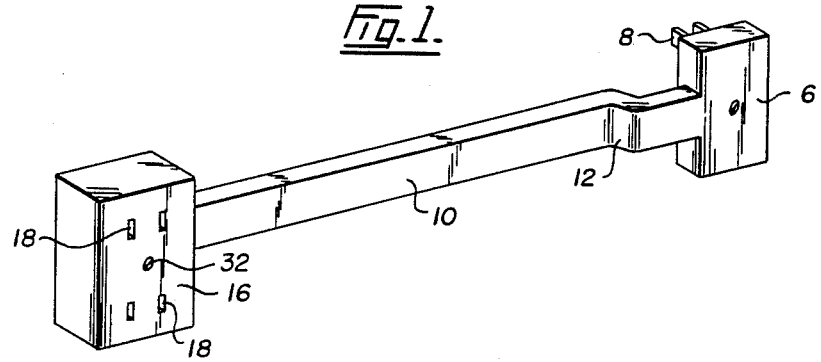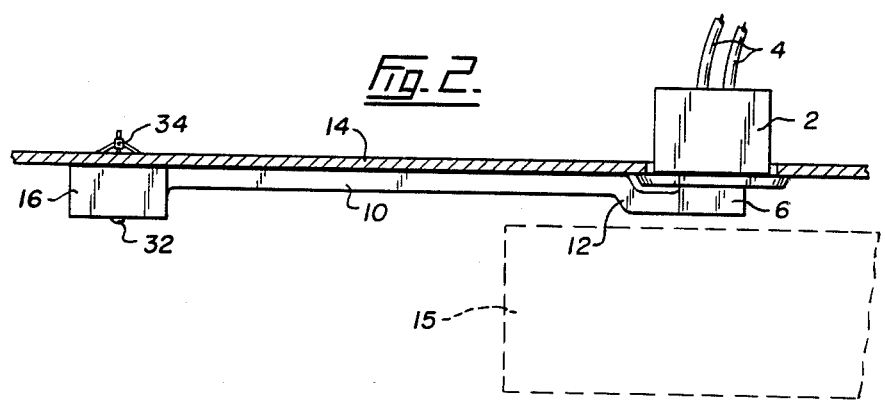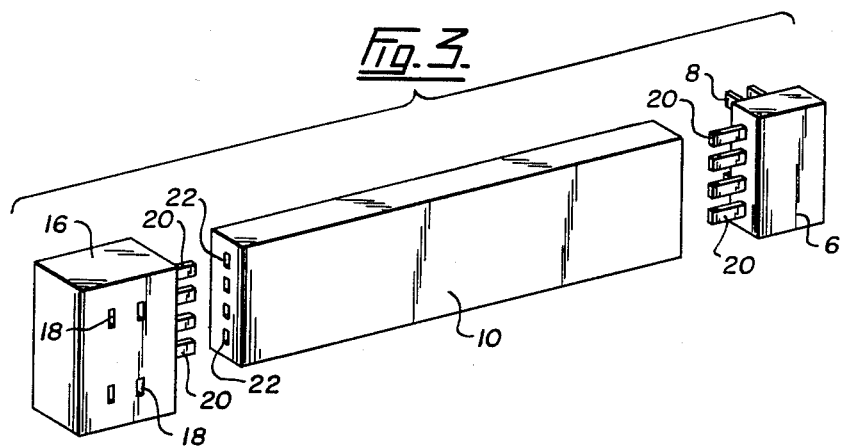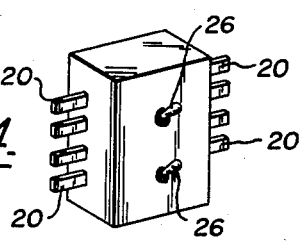

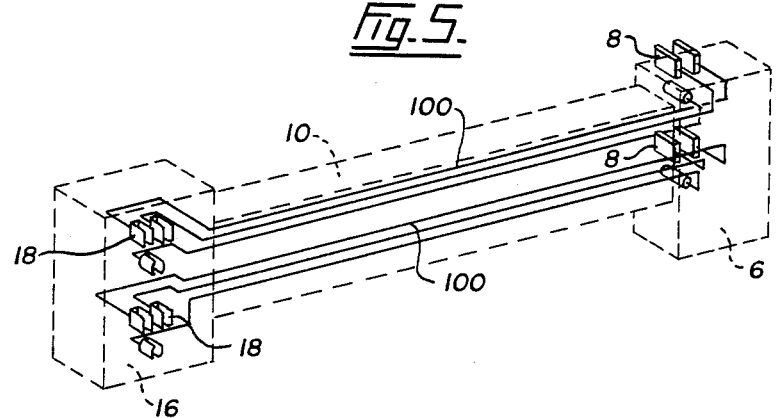
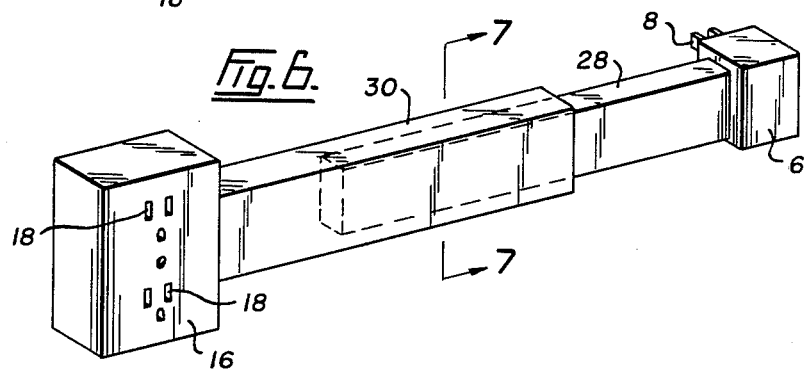
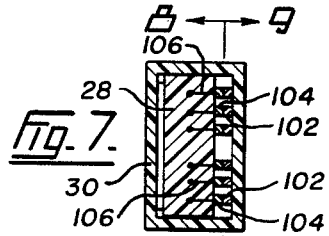
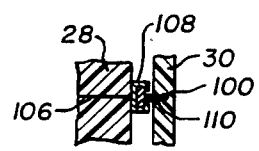
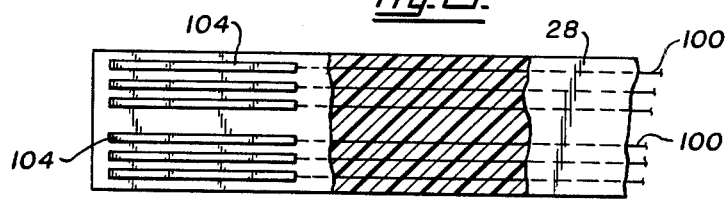
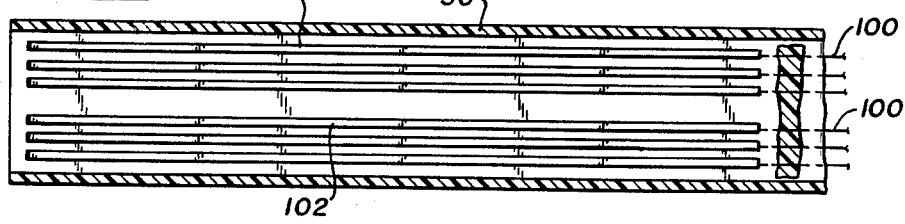

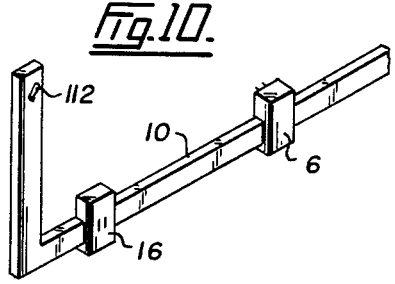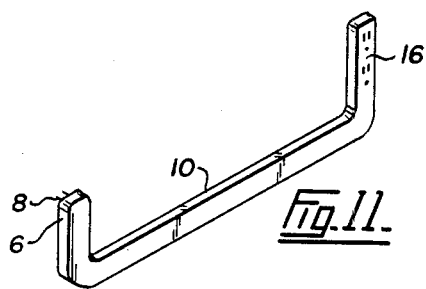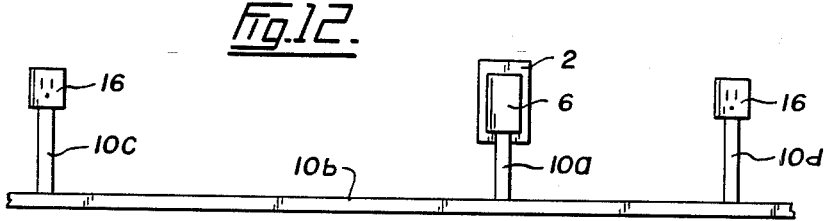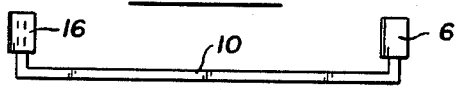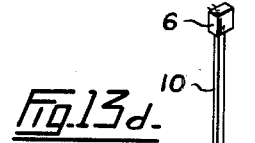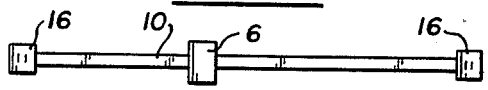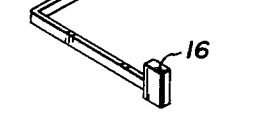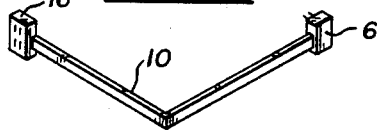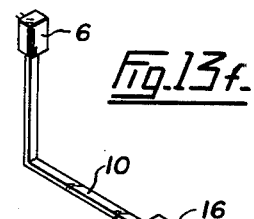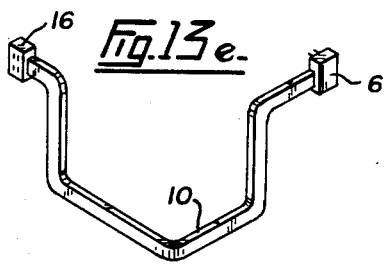

ELECTRICAL OUTLET

FIELD OF THE INVENTION

This invention relates to an apparatus to provide a remote outlet or slave outlet for an electrical outlet mounted on a wall or other part of a building.

DESCRIPTION OF THE PRIOR ART

Electrical outlets in buildings are, of course, well-known. Any modern building is provided with outlets fixed into the wall at the time of building and provided with a source of electrical power. Outlets may, of course, be added subsequently but only at some inconvenience. For example channeling may be cut in the walls and generally the structure of the existing building is changed.

The location of electrical outlets can be inconvenient if it is desired to position furniture, which can easily block off an outlet. If furniture is placed close to a wall then the outlet becomes useless. If an item is to be left permanently plugged then the same disadvantages do not result although, of course, the furniture must be moved a certain distance from the wall to allow the plug to engage the outlet. However where it is desired to disconnect a piece of electrical equipment frequently then the positioning of furniture by an outlet can be an inconvenience.

There have been a number of proposals to provide extension devices that can be attached to a standard wall outlet when the outlet is to be blocked in the above way. For example Quartarone in U.S. Pat. No. 4,146,281 discloses an articulated electrical extension device that can be attached to a standard wall outlet. However a conventional lead and plug is used. Bonhomme in U.S. Pat. No. 566,332 discloses a reel type wall extension socket. Abramson in U.S. Pat. No. 1,983,725 shows a cord type wall and baseboard mounted electrical extension device. Winders in U.S. Pat. No. 3,187,290 shows a floor mounted outlet extension device. Rooney in U.S. Pat. No. 3,221,287 discloses an outlet extension device with support means. Wayne in U.S. Pat. No. 2,441,461 shows a connection device that has a continuous outlet track so that an unordinary electrical plug can be inserted anywhere along its length and slid along the track. O'Brien in U.S. Pat. No. 2,495,280 shows a conductor strip that is yieldable and ribbon like. Cabral in U.S. Pat. No. 2,831,049 shows a conductor formed on adhesive backing. Severino in U.S. Pat. No. 3,029,303 shows an adhesively secured electrical device, reminiscent of the Cabral teaching Naughton in U.S. Pat. No. 2,611,800 shows the use of a conductor embedded in insulation designed to be used in the construction of a building and positioned flush in the plaster used to face the wall and Howk in U.S. Pat. No. 1,812,956 shows baseboard electrical devices.

All the devices shown in the prior art have found little commercial application. It is believed that in many circumstances the devices are excessively complicated or bulky whereas, of course, the conventional electrical outlet on a wall is commendably unobtrusive.

SUMMARY OF THE INVENTION

The present invention seeks to provide an apparatus that is able to provide a remote outlet for an electrical outlet that may be blocked off. Accordingly, in its broadest aspect, the present invention is an apparatus to provide a remote outlet from a master electrical outlet provided with electrical conducting recesses and connected to an electrical power source, the apparatus comprising a plug member; conductor prongs on the plug member to engage the recesses in the master outlet; conductor attachment means formed on the plug member, in electrical contact with the conductor prongs; a limb attached to and extending from the plug member; conductors in the limb, each conductor in electrical contact with one conductor prong of the plug member; conductor attachment means in the limb to releasably engage the conductor attachment means at the master outlet and in electrical contact with the conductors in the limb; a remote outlet attached to the limb, spaced from the plug member; further conductor attachment means at the distal end of the limb, in electrical contact with the conductors in the limb; conductor recesses in the remote outlet, each recess in electrical contact with a conductor in the limb; conductor attachment means in the remote outlet corresponding to the further conductor attachment means at said distal end of the limb and in electrical contact with the recesses in the remote outlet, whereby the limb may be disconnected from the plug member and the remote outlet; whereby a secondary outlet is provided remote from but duplicating the master outlet and in electrical contact with the master outlet.

BRIEF DESCRIPTION OF THE DRAWINGS

Aspects of the invention are illustrated, merely by way of example, in the accompanying drawings in which:

FIG. 1 is an isometric view of an apparatus according to the invention;

FIG. 2 is a plan view of the apparatus of FIG. 1, installed;

FIG. 3 is an exploded view of a further embodiment of the present invention;

FIG. 4 is a detail variation of the embodiment of FIG. 3;

FIG. 5 illustrates conductors within apparatus of the invention;

FIG. 6 is an isometric view showing a further feature of the invention;

FIG. 7 is a section on the line 7—7 in FIG. 6;

FIG. 7a shows an alternative arrangement to that of FIG. 7;

FIG. 8 is a section on the line 8—8 in FIG. 7;

FIG. 9 is a section on the line 9—9 in FIG 7;

FIGS. 10 to 12 show various arrangements according to the invention; and

FIGS. 13a to 13f show, somewhat diagrammatically various configurations possible with the apparatus of the present invention.

DESCRIPTION OF THE PREFERRED EMBODIMENTS

The drawings show an apparatus to provide a remote outlet, remote that is from a master electrical outlet 2 provided with electrical conducting recesses (not shown) and connected to an electrical power source through wires 4. The electrical outlet 2 is, of course, completely conventional.

The apparatus of the invention comprises a plug member 6 having conductor prongs 8 to engage the recesses in the master outlet 2. A limb 10 is attached to the plug member 6. In the embodiment illustrated in FIGS. 1 and 2 the limb 10 is provided with a bend 12 so that the main body of the limb 10 may lie against a wall 14, the arrangement being shown most clearly in FIG. 2; which also shows an obstacle 15.

There are conductors in the limb 10, one conductor in electrical contact with each conductor prong 8 in the plug member 2. There is a remote outlet 16 attached to the end of the limb 10 remote from plug member 6 and conductor recesses 18, corresponding to the recesses in the wall outlet 2 are provided in the remote outlet 16. Again each recess 18 in the remote outlet 16 is in electrical contact with a conductor in the limb 10. By this means a secondary or slave outlet is provided, in electrical contact with, but remote from and duplicating the master outlet 2. Outlets to receive double prong plugs are shown but, of course, circuits including a ground lead can equally easily be provided.

The length of the limb 10 can either be fixed, as in the embodiment of FIGS. 1 and 2, or a modular approach can be adopted as exemplified in FIG. 3. In the embodiment shown there the plug 6 is formed with conductor attachment means in the form of second prongs 2D in electrical contact with the first prongs 8. There are conductor attachment means in the form of corresponding sockets 22 in the limb 10 to releasably engage the prongs 20. At the other end of the limb there are further recesses 22 to receive secondary prongs 20 on the remote outlet 16. The embodiment of FIG. 3 is thus useful for either convenience of storage or for the fact that limbs 10 of varying length can be used to vary the distance between the plug member 6, (and thus the wall outlet 2) and the remote outlet 16.

As shown in FIG. 4 simple toggle switches 26, or other equivalent switches, may be provided. Such an embodiment can be useful as a means of closing off power to the remote outlet 16, for example if children can reach the remote outlet. The embodiment of FIG. 4 also demonstrates the use of further secondary prongs 20, that is to receive a plurality of the limbs 10 as shown in FIG. 3. Pull switches using cords or the like may also be used in place of toggle switches 26. The cords may be anchored in a wall above the apparatus.

FIG. 5 shows conductors 100 embedded within the apparatus and attached to prongs 8 and sockets 18 in conventional manner. FIG. 5 shows a three prong arrangement with a ground prong and socket. As indicated the invention is equally applicable to grounded and ungrounded circuits.

FIG. 6 illustrates an embodiment of the invention in which the limb 10 is telescopic, that is can be extended and retracted. An internal portion 28 of the limb can either be provided with flexible leads inside or can be provided with tracks, desirably on that side of the limb that will be against wall 14. An outer portion 30 of the limb 10 can be provided with corresponding leads or tracks to ensure electrical continuity.

FIGS. 7 to 9 illustrate means of making contact between portions 28 and 30. In FIGS. 7, 8 and 9 outer portion 30 has internal conductor tracks 102 attached to conductors 100. Corresponding external conductor tracks 104 are provided on internal portion 28. Tracks 102 and 104 are in contact with conductors 100 through leads 106.

In FIG. 7a a conductor track 108 in portion 28 slidably receives slide 110. Track 108 and slide 110 are in electrical contact with conductors 100.

FIG. 10 shows limb 10 extending beyond outlet 16 and plug member 6. A switch 112 is shown at an end of limb 10. FIG. 11 shows the outlet 6, with prongs 8 formed as a simple continuation of limb 10. Such an embodiment is very compact.

FIG. 12 illustrates a plug member 6 attached to a wall outlet 2. A first limb 10a extends to contact a second limb 10b, in turn in contact with limbs 10c and 10d extending to remote outlets 16. The limbs 10a to 10d may be formed as one continuous piece but the modular approach, as exemplified in FIG. 3, may be used.

FIGS. 13a through 13f simply illustrate the use of various shapes of limbs 10.

FIG. 13e illustrates the use of a plastically deformable limb, that is a limb that can be put in one shape and will then retain that shape. Such device can have wide application.

It should also be noted from FIGS. 1 and 2 that attachment means may be provided to locate the remote outlet 16 against the wall 14. In the illustrated embodiment a screw 32 extends through the remote outlet 16, through the wall 14 to engage a conventional anchor 34 on the far side of the wall 14.

The apparatus of the present invention may be made of plastics conventionally useful in the electrical field, that is exhibiting good insulation properties. PVC, nylon and the like may be used. The plastic may be hot or cold moldable. The conductors used will, generally, be of copper or aluminum, in conventional manner and in compliance with local bylaws. The plastic will usually be structurally rigid, apart from the use as shown in FIG. 13e.

The present invention provides an apparatus that is quick to install, is out of the way when in use and thus does not present a potential hazard as an extension cord can, and can be installed without any professional help as no installation of sockets or changes in building structure are required.

I claim:

1. Apparatus to provide a remote outlet from a master electrical outlet provided with electrical conducting recesses connected to an electrical power source, the apparatus comprising:

a plug member;

conductor prongs on the plug member to engage the recesses in the master outlet;

conductor attachment means formed on the plug member, in electrical contact with the conductor prongs;

a limb adapted to be attached to the plug member;

conductors in the limb, each conductor adapted to be in electrical contact with one conductor prong of the plug member;

conductor attachment means in the limb to releasably engage the conductor attachment means at the master outlet and in electrical contact with the conductors in the limb;

a remote outlet;

further conductor attachment means at the distal end of the limb, in electrical contact with the conductors in the limb;

conductor recesses in the remote outlet, each recess adapted to be in electrical contact with a conductor in the limb;

conductor attachment means in the remote outlet corresponding to the further conductor attachment means at said distal end of the limb and in electrical contact with the recesses in the remote outlet, whereby the limb may be disconnected from the plug member and the remote outlet;

whereby a secondary outlet is provided remote from but duplicating the master outlet and adapted to be in electrical contact with the master outlet.

2. Apparatus as claimed in claim 1 in which the limb is extendible and retractable.

3. Apparatus as claimed in claim 1 including means to locate the remote outlet on a wall.

4. Apparatus as claimed in claim 1 in which the limbs are plastically flexible.

5. Apparatus as claimed in claim 1 including at least one switch formed in the plug member or the remote outlet.

* * * * *